United States Patent [19] [11] 3,884,439
Jeninga [45] May 20, 1975

[54] GOLF BAG CRADLE-BRACKET

[75] Inventor: John Jeninga, Delavan, Wis.

[73] Assignee: Atlantic Products Corporation, Trenton, N.J.

[22] Filed: Nov. 26, 1973

[21] Appl. No.: 418,983

[52] U.S. Cl. .................... 248/96; 211/71; 248/129; 248/311

[51] Int. Cl. .......................................... A63b 55/08

[58] Field of Search ....... 248/96, 98, 129, 139, 311, 248/312, 313, 60; 280/DIG. 5, DIG. 6, 47.26, 47.13 R, 47.19, 179 A; 150/1.5 B; 211/71

[56] References Cited
UNITED STATES PATENTS

| 2,782,052 | 2/1957 | Albrecht et al. ............ 280/179 A X |
| 2,822,969 | 2/1958 | Cooper ......................... 280/DIG. 6 |
| 2,962,106 | 11/1960 | Burnside et al. ............... 280/DIG. 5 |
| 3,079,166 | 2/1963 | Abgarian ...................... 280/DIG. 6 |
| 3,181,704 | 5/1965 | Thomas .......................... 211/71 X |
| 3,365,228 | 1/1968 | Hay .............................. 248/311 X |
| 3,610,559 | 10/1971 | Leitzel .............................. 248/96 |
| 3,784,138 | 1/1974 | Herling et al. ..................... 248/96 |
| 3,787,017 | 1/1974 | Sauer ................................ 248/96 |
| D185,901 | 8/1959 | Parrett ......................... 280/DIG. 5 |

FOREIGN PATENTS OR APPLICATIONS

| 794,246 | 4/1958 | United Kingdom ........... 280/DIG. 6 |
| 236,050 | 6/1960 | Australia ....................... 280/DIG. 6 |
| 240,416 | 1/1961 | Australia ....................... 280/DIG. 6 |
| 680,052 | 10/1952 | United Kingdom ........... 280/DIG. 6 |

Primary Examiner—Roy D. Frazier
Assistant Examiner—Rodney H. Bonck

[57] ABSTRACT

An arcuate, depending flexible cradle member of hollow resilient material is suspended between and supported at its ends by two spaced side support bracket members, the assembly being dimensioned and shaped to readily accept and firmly support a golf bag while sharply reducing wear of the bag at its engaging surfaces.

6 Claims, 15 Drawing Figures

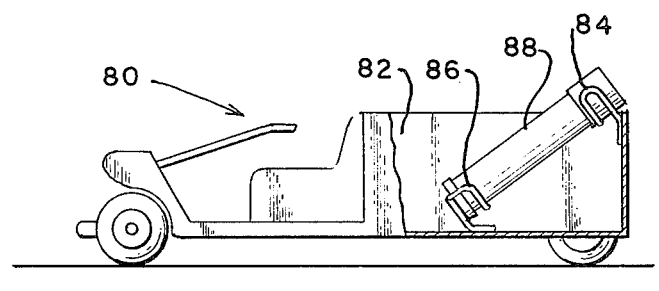
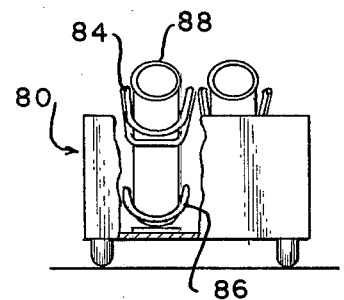
Fig. 10  Fig. 11
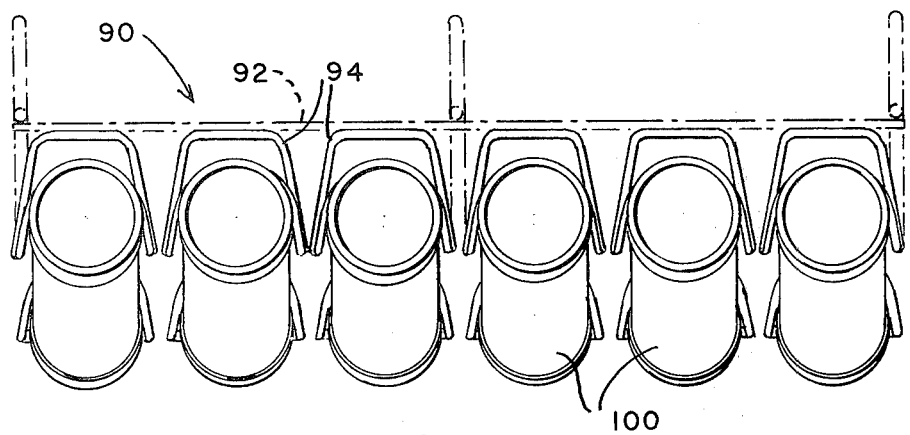
Fig. 12
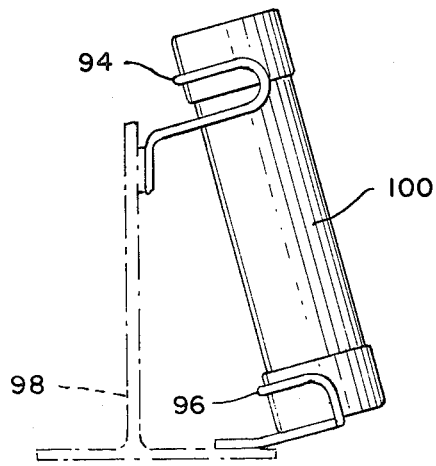
Fig. 13

GOLF BAG CRADLE-BRACKET

BACKGROUND OF INVENTION

This invention relates to golf bag support devices, and particularly to golf bag brackets which are used on golf carts and other golf bag support devices.

It is important to the golfer that anyone of the clubs that he might require in the course of a round of golf be readily available. Consequently, a great deal of interest and importance is placed by the golfer on the type of bag and the type of cart or carrying means he uses. At the present time, very few golfers use, or have available to them, caddies for carrying their golf bags. Consequently, it has been necessary for almost all golfers to use golf carts and golf bag support devices for their golf bags.

The consequent large demand for golf carts resulted in many different types of units having different construction features, advantages, and drawbacks. To this date, there has not been a unit which combined all of the desirable features of golf bag support design.

Accordingly, it is the principal object of this invention to combine in one unit all of the desirable features of golf bag support devices.

It is a still further object of this invention to provide a golf bag support assembly which readily receives a golf bag with no need for special adjustment in modification of the support member to receive the golf bag.

It is another object of the invention to provide a golf bag support assembly in which the bag is held firmly in position and is provided with both lateral and vertical support.

It is a still further object of this invention to provide a golf bag support assembly which has no complex and cluttered adjustment mechanism to delay placing of the golf bag on the support assembly.

It is a still further object of this invention to provide a simple functional design which provides maximum support and has no special adjustable parts.

It is a still further object of this invention to provide a different type of golf bag support assembly which receives the golf bag and automatically provides a continuous support surface conformable with the periphery of the golf bag.

Another object of this invention is to provide a golf bag support assembly which reduces wear of the golf bag surfaces due to vibration of the golf bag support assembly.

It is a still further object of this invention to provide a golf bag support assembly which provides for cushioned support of the golf bag and eliminates all metal contact with the golf bag surfaces.

These and further objects and advantages of this invention will become apparent from the following description and claims.

DESCRIPTION OF THE DRAWINGS

FIG. 10 shows a motorized golf cart with the cradle-bracket assembly thereon.

FIG. 11 is a rear view of the golf cart of FIG. 10.

FIG. 12 is a top view of a golf bag rack using the cradle-bracket units.

FIG. 13 is a side view of the golf bag rack of FIG. 12.

DESCRIPTION OF INVENTION

Figure 1:
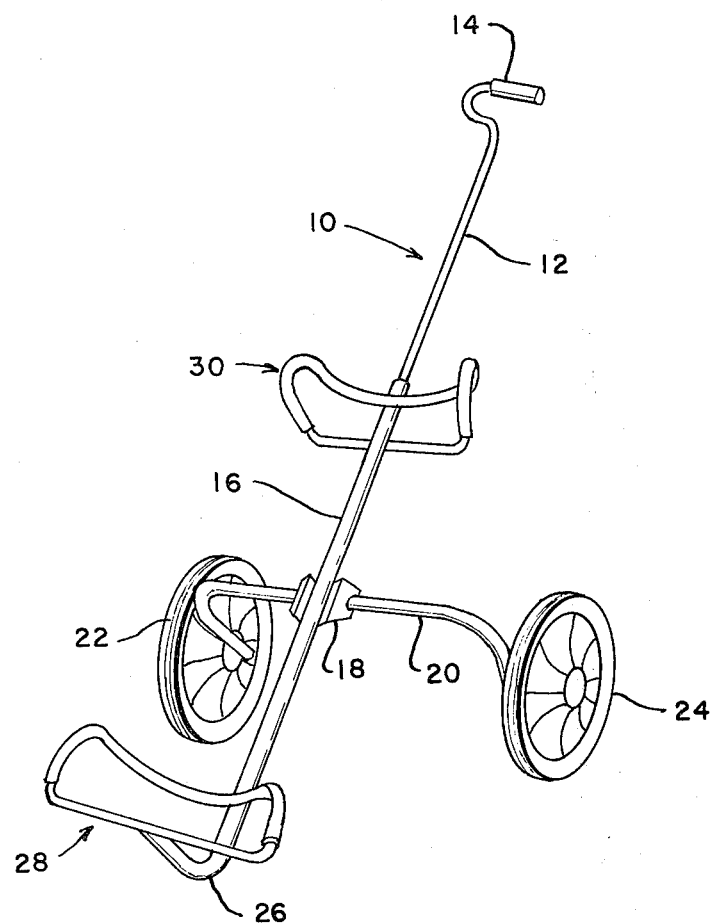
FIG. 1 shows a perspective view of a golf cart using the cradle-bracket of the subject invention.
Figures 2, 3:
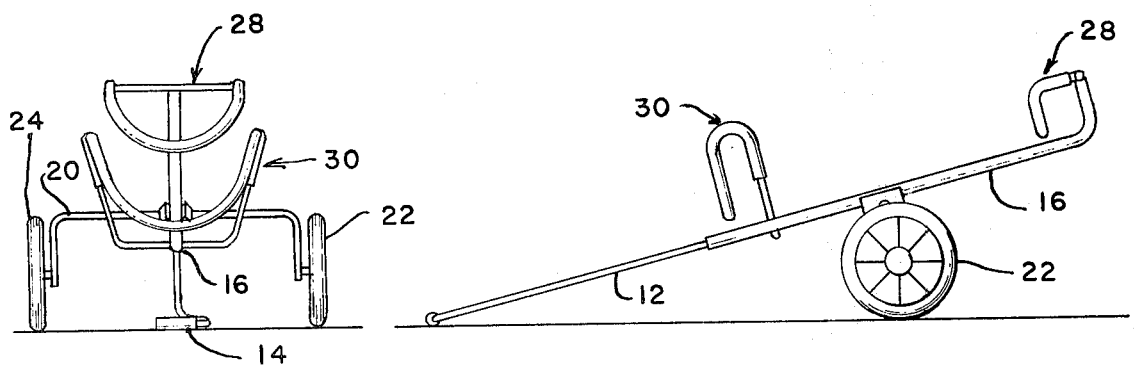
FIG. 2 is an end view of the golf cart of FIG. 1 with the lower end raised to show the configuration of the cradle members.
FIG. 3 is a side view of FIG. 2.

Referring particularly to FIGS. 1 to 3, a golf hand cart generally indicated at 10 has a telescopic adjustable handle support member 12 with a handle 14 at the end thereof which is fitted into an elongated tubular stem 16. A coupling piece 18 connects the elongated stem 16 to the wheel support bar 20 which has wheels 22 and 24 mounted at each end thereof.

The lower end of elongated stem 16 is curved upwardly and outwardly at 26 and supports the lower cradle-bracket assembly 28. The upper cradle-bracket assembly 30 is disposed adjacent the upper end of the tubular stem 16.

Figure 4:
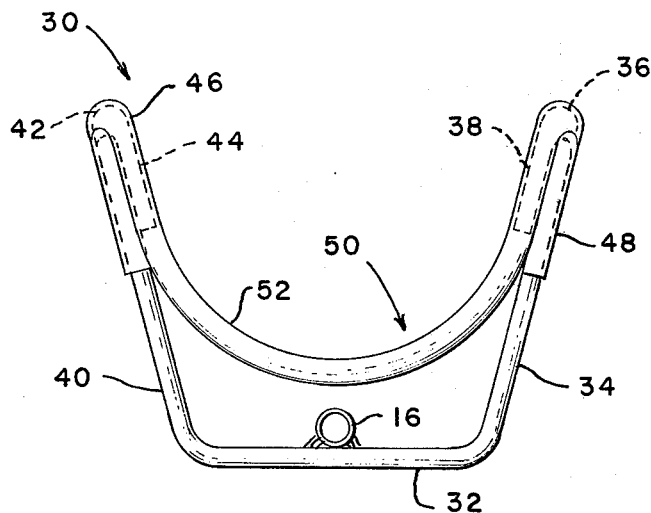
FIG. 4 is a view of the upper cradle-bracket assembly of the golf cart shown in FIGS. 1 to 3.
Figure 5:
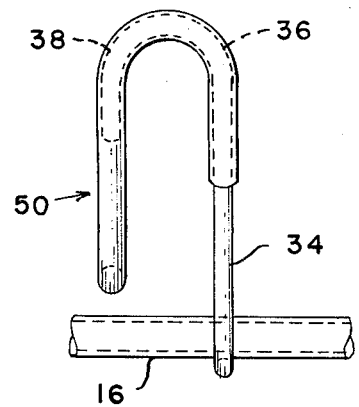
FIG. 5 is a side view of FIG. 4.

A more detailed showing of the upper cradle and support assembly 30 is shown in FIG. 4. The central section 32 of the tubular support member is either welded or bolted to the tubular stem 16. It is bent to provide an upwardly extending end section 34 having a circular bent section 36 with a straight end section 38 to form an inverted U shape, disposed in a plane at approximately 15° with the stem axis. The other side of the support bracket has corresponding parts, 40, 42, and 44 resulting in a symmetrical support bracket with upstanding ends disposed substantially above the elongated stem 16.

The tubular bracket 32 is made of conventional metal tubing, and preferably is one-half diameter 16 gauge steel tubing.

A central depending cradle member formed of resilient materials, such as polyvinyl chloride, is fitted over the inverted U sections of the bracket support member 32 at each of its ends as shown at 46 and 48. It is disposed in a semicircular arc and dimensioned to conform to a golf bag periphery.

Figure 6:
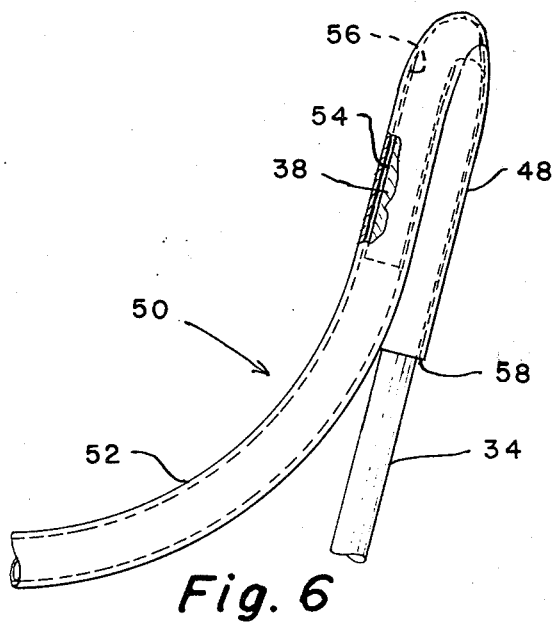
FIG. 6 shows an enlarged portion of FIG. 4 which is partially cut away.

The cradle member is flexible and resilient thin-walled tubing which has an inner diameter slightly larger than the outer diameter of the metal tubing. Preferably, the metal tubing has an outer diameter of one-half inch, while the inner diameter of the flexible tubing is nine-sixteenths of an inch. The outer diameter of the flexible tubing is three-quarters of an inch. The clearance shown in FIGS. 6 and 7 in the cut-away section is slightly exaggerated for purposes of illustration. The central section of the cradle member 52 forms a circular section approximately equal to a semicircular arc on which the golf bag is supported. In FIG. 6 the slight clearance between the tubular end 38 of the tubular support bracket is shown with the clearance 54 between it and the inner periphery 56 of the tubular cradle member. The end portion 48 of the cradle member 50 extends up and around the inverted U portion of the support bracket 32, covering end section 38, semicircular section 36 and the upper section of the upright member 34, terminating at 58.

This section is mounted to the upright member by pressing the tubular member over it. Moisture is applied to the upright support section and this, together with the small clearance, makes it possible to force the end of the cradle member 48 up and around the inverted U-configured portion of the bracket. This gives a tight engaging friction fit and it is not possible to move the cradle after the moistened surfaces have dried.

The end 58 of the cradle member is disposed far enough downwardly on upright 34 to provide a sleeve section which precludes direct contact between any surfaces of the golf bag and the bracket member. The upright bracket 40 similarly receives the end 46 of the cradle member 50, as shown in FIG. 4.

Figure 8:
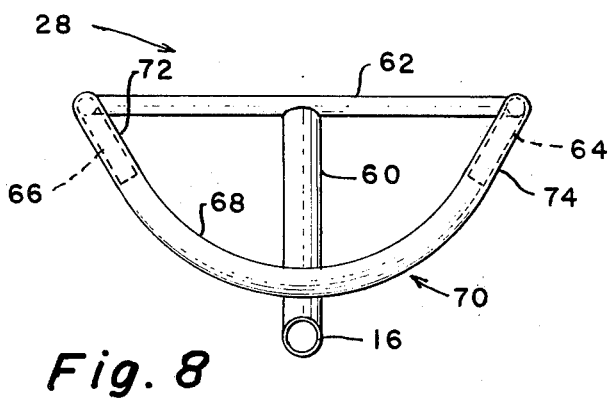
FIG. 8 shows the lower support and cradle-bracket of the golf cart of FIGS. 1 to 3.
Figure 9:
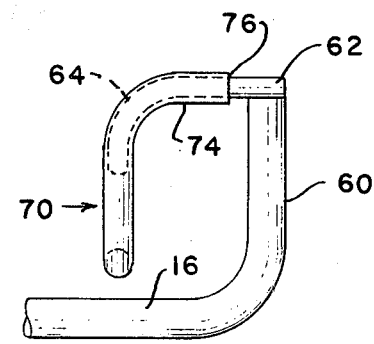
FIG. 9 is a side view thereof.

The lower cradle and support assembly 28 is shown in FIG. 8. A central steel tubular member 62 is welded to the upwardly curved section 60 of the stem 16. Member 62 has two upwardly extending sections 64 and 66 at each end thereof, each having a curved end.

The lower cradle member 70 has its ends 72 and 74 telescopically mounted over the end of upright curved support members 64 and 66. The end 74 of the cradle member extends to a point 76 which will shield the golf bag from direct engagement with the support members to prevent wear and abrasion.

FIG. 10 shows a side view of a golf cart generally indicated at 80 which has an open top compartment 82 shown through the cut-away panel. Cradle and support assemblies 84 and 86 are similar to those described in the preceding description of FIGS. 4 through 9. They are mounted so that the golf bag is firmly supported in an angular fashion within the golf cart itself. In view of the angular inclination and the support given to the golf bag 88 by the brackets 84 and 86, it is not necessary to strap the golf bag in position.

A golf bag rack for a number of golf bags, such as may be used in a golf pro-shop, or outside the club house of a golf course, is shown in FIG. 12. The assembly is generally indicated at 90 and has a longitudinally extending crosspiece 92 to which golf bag cradle-bracket members indicated at 94 are fastened. A lower cradle-bracket assembly 96 is fastened to the bottom support piece of the rack 90 as shown in FIG. 13. The golf bags 100 are held in position by gravity and are readily placed in the cradle and support assemblies for firm adequate support.

Figure 14:
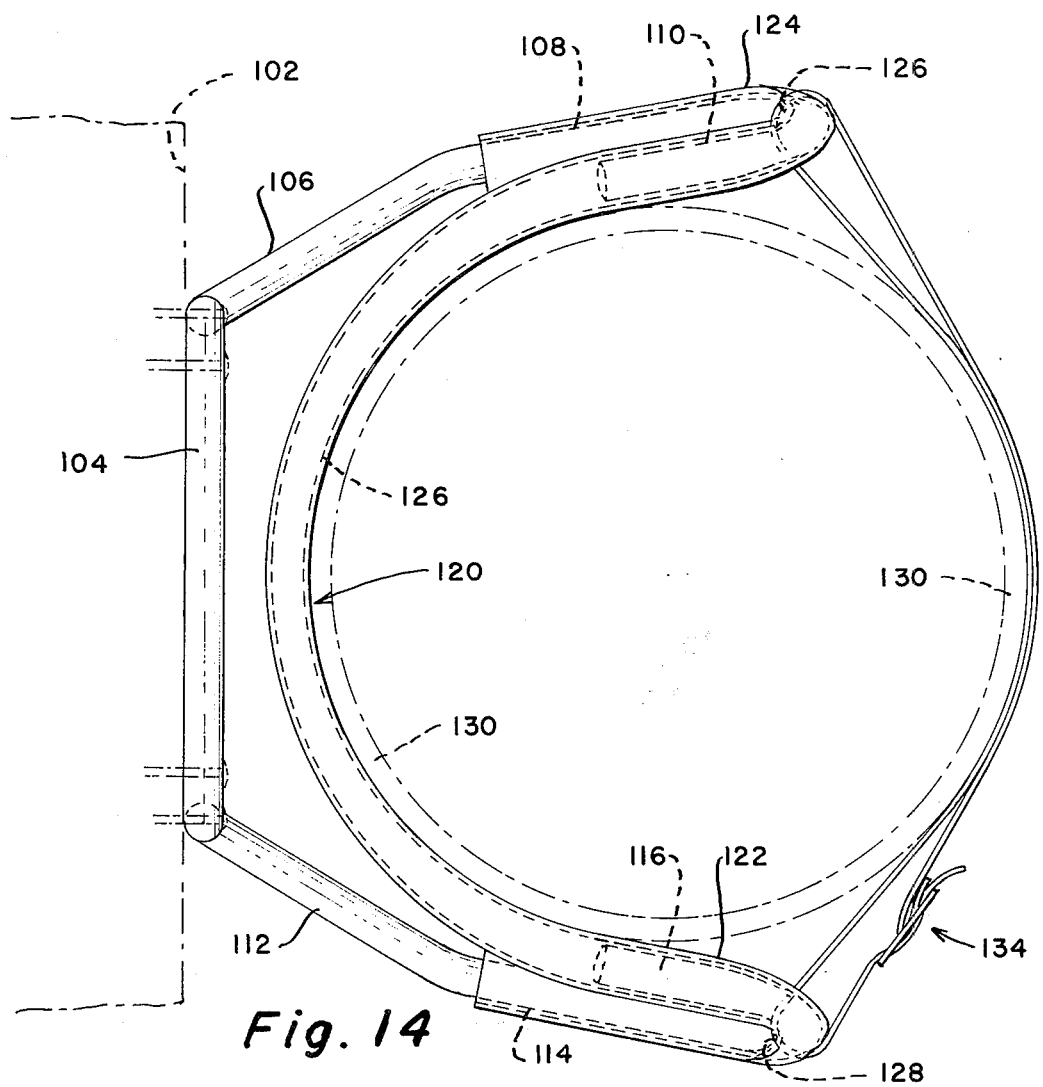
FIG. 14 is a top view of the cradle-bracket unit as it could be used on the rear panel of a motorized golf cart with an outline of the bag surface showing use of a retaining strap.

An enlarged top view of the cradle-bracket unit showing the peripheral outline of the golf bag and its fit within the assembly is shown in FIG. 14. This particular modification shows an adaption for use on the rear panel 102 of a motorized golf cart. The central portion 104 of the tubular support bracket has an outwardly extending member 106 which has an inverted U-shaped, end section composed of portions 108 and 110. A similar outwardly extending section 112 supports an inverted U-shaped, end section having members 114 and 116 to provide two symmetrical and opposed support members where the end thereof extends to a point just short of the mid-portion of the cross-sectional configuration of the golf bag, as shown in FIG. 14.

The cradle member 120 has an end 122 which is telescopically mounted over the U-shaped end sections and their members 114 and 116 of the support 112. Similarly the other end of 124 of the cradle member 120 is telescopically fitted over the members 108 and 110 of the upright supportive member 106.

Figure 7:
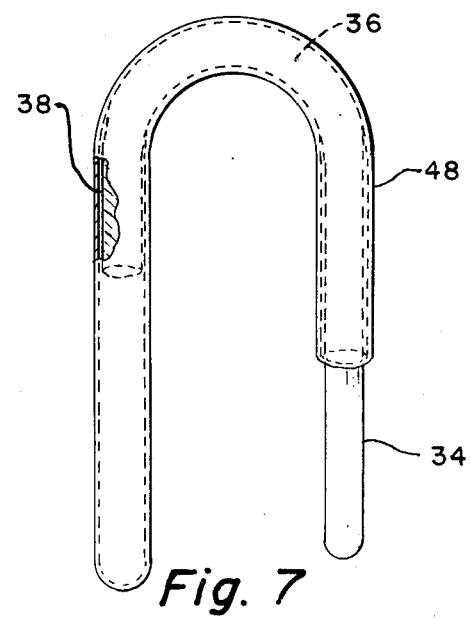
FIG. 7 is a side view of FIG. 6.

The fit of the cradle member on these two end sections is similar to that discussed with reference to FIGS. 6 and 7 above. It is believed that the small clearance is lost between the cradle member and the tubular support, and there is direct frictional contact between the two members as the ends of the cradle member extend around the curved sections 126 and 128 of the U-shaped end sections.

A general outline of the golf bag collar 130 and the golf bag proper 132 is shown to illustrate the manner in which the cradle member and support members cooperate to receive the bag itself.

Figure 15:
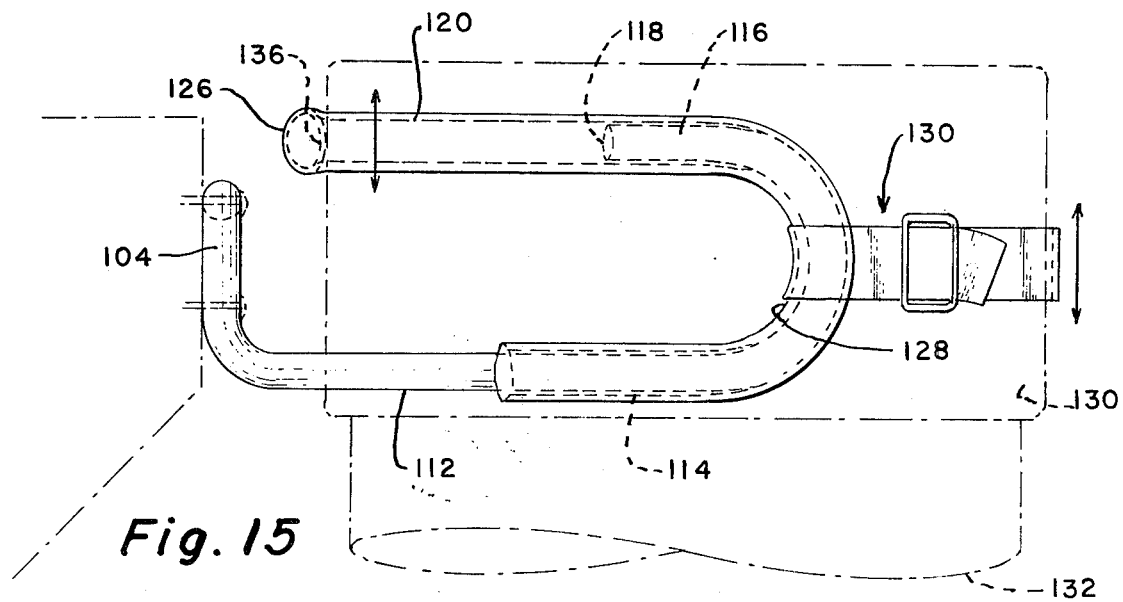
FIG. 15 is a side view of FIG. 14.

In FIGS. 14 and 15 the golf bag is supported in a vertical position at the back of a motorized golf cart, and it is possible to use only the upper cradle and support unit with a bag receiving shelf at the bottom of the cart to support the bottom of the bag. However, since the bags are supported vertically in this instance, it is necessary to use a retaining strap 134 which extends from the curved portions of the support brackets and extends around the periphery of the golf bag.

OPERATION

It will be noted from the foregoing that the cradle-bracket assembly has universal application, in that it can be used either on a manually pulled golf cart, a motorized golf cart, or used to support a plurality of golf bags in a rack. The flexibility of the cradle member makes it possible for it to engage the golf bag along a continuous line. In addition, it should be noted with reference to FIG. 15 that the circular cross section actually will provide a line contact, rather than a full large area contact in supporting the bag. It should also be noted that with the cradling means being resilient and flexible it will move with any vibration of the support brackets and with the bag to eliminate a great deal of relative movement between the bag and the support.

The contour matching feature is important, and in this regard, it should also be noted, particularly with reference to FIG. 14, that the U-shaped end sections are also angled outwardly slightly at approximately 10° to 15° to the vertical to eliminate any possible binding action. This makes it possible for a bag to be readily inserted within the cradle-bracket assembly where a snug engagement with the bag is obtained without bringing about a binding or obstruction action that would result if the U-shaped end sections were disposed parallel to the center line.

It should also be noted, as pointed out before, that the end members 110 and 116 of the U-shaped sections of the support members are disposed closer to the center line of the cradle-bracket assembly. The preferred inclination of the plane contained in the end sections is 15°. This construction is typical for all of the cradle-bracket assemblies shown with reference to this invention.

In FIG. 15, the flexibility of the cradle member 120 is illustrated. The cradle member is made of thin-walled plastic tubing having an outer diameter of three-quarters of an inch and an inner diameter of nine-sixteenths of an inch. Consequently, if any vibration or movement of the bag results from travel of the golf cart over uneven ground, the cradle member will be disposed to move with the bag, rather than setting up a rubbing action.

There is also a possibility that in some instances, where the bag is strapped, rather than being supported merely by gravity, there may be a slight twisting action of the center section of the cradle member 120.

It should be noted that the ends of the cradle member serve the dual purpose of both supporting the cradle member itself and providing a smooth protective surface between the bag and the metal support members. This also assists in reducing wear of the bag at those places that might be in direct engagement with a metal supporting piece.

The construction of the cradle member and the outwardly flared configuration of the U-shaped members of the support brackets make it possible to eliminate special movable parts which would provide adjustment to fit a bag contour.

The cradle member is preferably made of plastic material, such as polyvinyl chloride, which has a low friction surface. Other types of resilient material might be used for the cradle member, and would provide substantially the same effect. However, it is believed that with the use of low friction type material, the chances of bag wear are further minimized.

It should be noted with reference to FIGS. 14 and 15 that with the standard type of bag diameter at the upper collar section, and with the dimensioning of the cradle and bracket members to snugly receive the periphery of the golf bag, it is possible to provide firm and good support for the bag without requiring in many instances the use of a strap or other holding and fastening device. This is particularly true with respect to the rack units shown in FIGS. 12 and 13, as well as in the cart devices. However, if there is a chance of rough terrain, it might be advisable in the golf cart configuration of FIGS. 10 and 11 to employ a strap to reduce movement of the bag in the support assemblies.

While this invention has been described as having a preferred design, it will be understood that it is capable of further modification. This application is, therefore, intended to cover any variations, uses or adaptations of the invention following the general principles thereof and including such departures from the present disclosure as come within known or customary practice in the art to which this invention pertains, and as may be applied to the essential features hereinbefore set forth and fall within the scope of this invention or the limits of the appended claims.

What I claim is:

1. A golf bag bracket assembly comprising a support, two laterally spaced support members of circular cross section connected to the support, each of which has a laterally extending side support section for providing side support for a golf bag, said side support sections having an inverted "U" shape with one downwardly extending free end, the side support sections being opposed to and spaced from each other so that the golf bag can be placed between them, said side support section tangentially engaging the bag peripherally at its widest cross section area, downwardly extending and flexible cradling means of thin-walled flexible tubular material disposed between and supported by the side support sections, the cradling means having an unsupported central section which extends downwardly at a sufficient depth to receive substantially half of the peripheral cross section of the golf bag, the cradling means being adapted to engage the periphery of the bag being of sufficient flexibility to provide both a continuous cushioned surface and a movable support which moves with the bag so as to substantially reduce chafing wear at the bag surface in contact with and supported by the cradling means, the cradling means having an inner diameter which is slightly larger than the outer diameter of the support members, the ends of the thin-walled tubular material disposed substantially over the side support section of the corresponding support member.

2. The golf bag bracket assembly as set forth in claim 1 wherein the downwardly extending free end of one of the side support sections is disposed opposite the free end of the other of the side support sections, and the other leg of each inverted "U" shaped side support section is integral with an elongated member connected to the support.

3. A golf bag rack assembly comprising a pair of upper and lower aligned assemblies according to claim 1, the lower of said assemblies including abutment means for supporting the lower end of a golf bag peripherally supported in said upper and lower aligned assemblies.

4. The golf bag bracket assembly according to claim 3 wherein the support consists of a central stem, a wheeled assembly connected thereto, an elongated handle attached to the support extending upwardly beyond the upper bag bracket assembly.

5. The golf bag bracket assembly as set forth in claim 3 wherein a plurality of pairs of aligned upper and lower bracket assemblies having their side support sections extending in one direction are disposed side by side, the upper and lower assemblies of each pair being inclined at a small angle with respect to the vertical so that the lower bracket assembly is disposed further in said one direction than the upper bracket assembly.

6. The golf bag bracket assembly as set forth in claim 3 wherein the upper bracket assembly is disposed adjacent to the upper surface of the rear panel of a mobile golf cart so that the upper portion of a golf bag will extend above and clear of said surface.

* * * * *